(12) United States Patent
Van Egmond

(10) Patent No.: US 11,577,938 B2
(45) Date of Patent: Feb. 14, 2023

(54) SPLIT CRANE FOR INSTALLATION OF WIND TURBINES AND OTHER TALL STRUCTURES

(71) Applicant: Heerema Marine Contractors Nederland SE, Leiden (NL)

(72) Inventor: Jan Van Egmond, Katwijk (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 0 days.

(21) Appl. No.: 17/251,612

(22) PCT Filed: Jun. 14, 2019

(86) PCT No.: PCT/NL2019/050369
§ 371 (c)(1),
(2) Date: Dec. 11, 2020

(87) PCT Pub. No.: WO2019/240585
PCT Pub. Date: Dec. 19, 2019

(65) Prior Publication Data
US 2021/0261386 A1    Aug. 26, 2021

(30) Foreign Application Priority Data

Jun. 14, 2018  (NL) .................................... 2021125
Jan. 7, 2019   (NL) .................................... 2022349

(51) Int. Cl.
*B66C 1/00*      (2006.01)
*B66C 1/10*      (2006.01)
(Continued)

(52) U.S. Cl.
CPC .............. *B66C 1/108* (2013.01); *B63B 27/08* (2013.01); *B63B 27/10* (2013.01); *B63B 35/003* (2013.01);
(Continued)

(58) Field of Classification Search
CPC ......... B66C 1/108; B66C 13/08; B66C 23/16; B66C 23/207; B66C 23/28; B66C 23/52;
(Continued)

(56) References Cited

U.S. PATENT DOCUMENTS

2002/0129755 A1    9/2002   Hagen et al.

FOREIGN PATENT DOCUMENTS

| CN | 101468774 A | 7/2009 |
| CN | 102425145 A | 4/2012 |

(Continued)

OTHER PUBLICATIONS

International Search Report and Written Opinion dated Aug. 23, 2019, corresponding to Application No. PCT/NL2019/090369.
(Continued)

*Primary Examiner* — Emmanuel M Marcelo
(74) *Attorney, Agent, or Firm* — Patterson + Sheridan, LLP

(57) ABSTRACT

The present invention relates to a method for installing a wind turbine or other tall structure at a target location at sea, the method comprising: —providing an installation vessel comprising at least one crane, wherein the crane comprises a lower boom part, a right boom part, and a left boom part, wherein the right boom part and the left boom part are connected to an upper portion of the lower boom part and extend from said upper portion, wherein a space is present between the right and left boom part, —lifting a tall structure part, in particular the nacelle assembly, with the crane, wherein in top view the tall structure part is supported at least partially between the right and left boom part by one or more hoist lines extending from the right and left boom part to the tall structure part.

23 Claims, 15 Drawing Sheets

(51) Int. Cl.
  *B63B 27/08* (2006.01)
  *B63B 27/10* (2006.01)
  *B63B 35/00* (2020.01)
  *B66C 23/18* (2006.01)
  *B66C 23/52* (2006.01)
  *B66C 23/64* (2006.01)

(52) U.S. Cl.
  CPC ............ *B66C 23/185* (2013.01); *B66C 23/52* (2013.01); *B66C 23/64* (2013.01); *B63B 35/00* (2013.01); *B66C 2700/0321* (2013.01)

(58) Field of Classification Search
  CPC ....... B66C 23/525; B66C 23/68; B63B 27/10; B63B 35/003
  See application file for complete search history.

(56) References Cited

FOREIGN PATENT DOCUMENTS

| | | |
|---|---|---|
| CN | 102502422 A | 6/2012 |
| CN | 202594666 U | 12/2012 |
| DE | 1246200 B | 8/1967 |
| GB | 766718 A | 1/1957 |
| JP | H11343097 A | 12/1999 |
| JP | 2001072380 A | 3/2001 |
| JP | 2018095437 A | 6/2018 |
| KR | 20110100570 A | 9/2011 |
| KR | 101790970 B1 | 10/2017 |
| NL | 8802954 A | 6/1990 |
| WO | 02/14144 A1 | 2/2002 |
| WO | 2011028102 A2 | 3/2011 |
| WO | 2014027201 A1 | 2/2014 |
| WO | 2018215458 A1 | 11/2018 |
| WO | 2018234337 A1 | 12/2018 |
| WO | WO-2020135906 A1 * | 7/2020 ............ B66C 13/08 |

OTHER PUBLICATIONS

Netherlands Search Report dated Apr. 10, 2019, corresponding to Application No. 2021125.
PCT Third Party Observation dated Oct. 9, 2020 for Application No. PCT/NL2019/050369.
EPO Communication pursuant to Rule 114(2) EPC dated Sep. 12, 2021 for Application No. 19743062.2.
EPO Communication with Third Party Observation dated Nov. 21, 2022, for European Application No. 19743062.2.

* cited by examiner

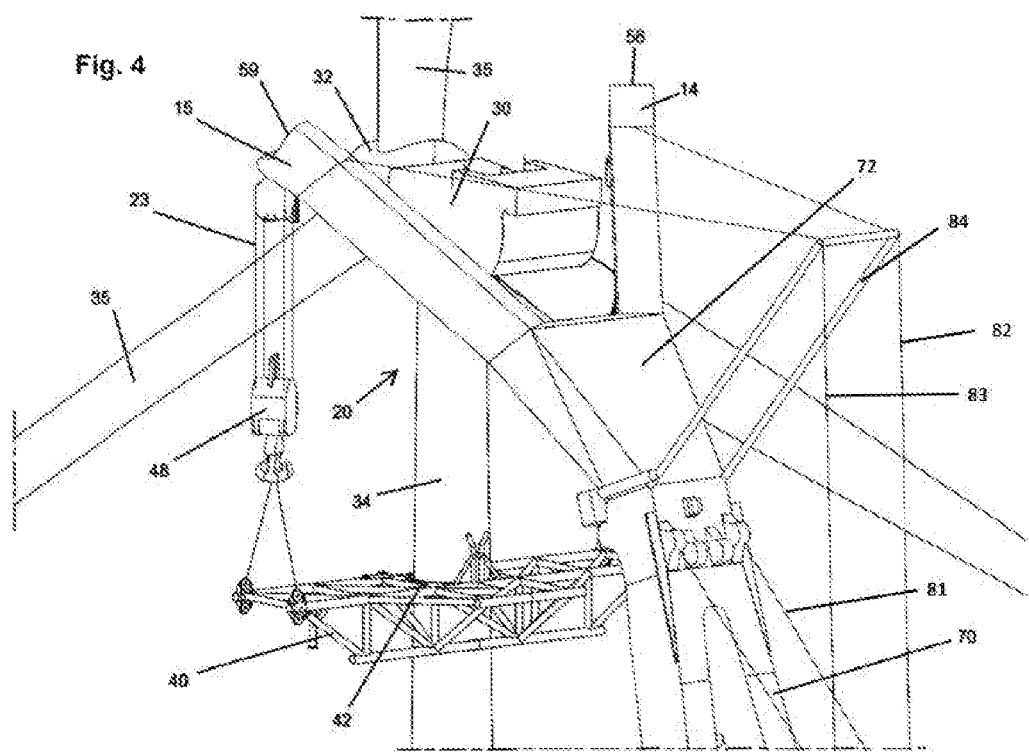

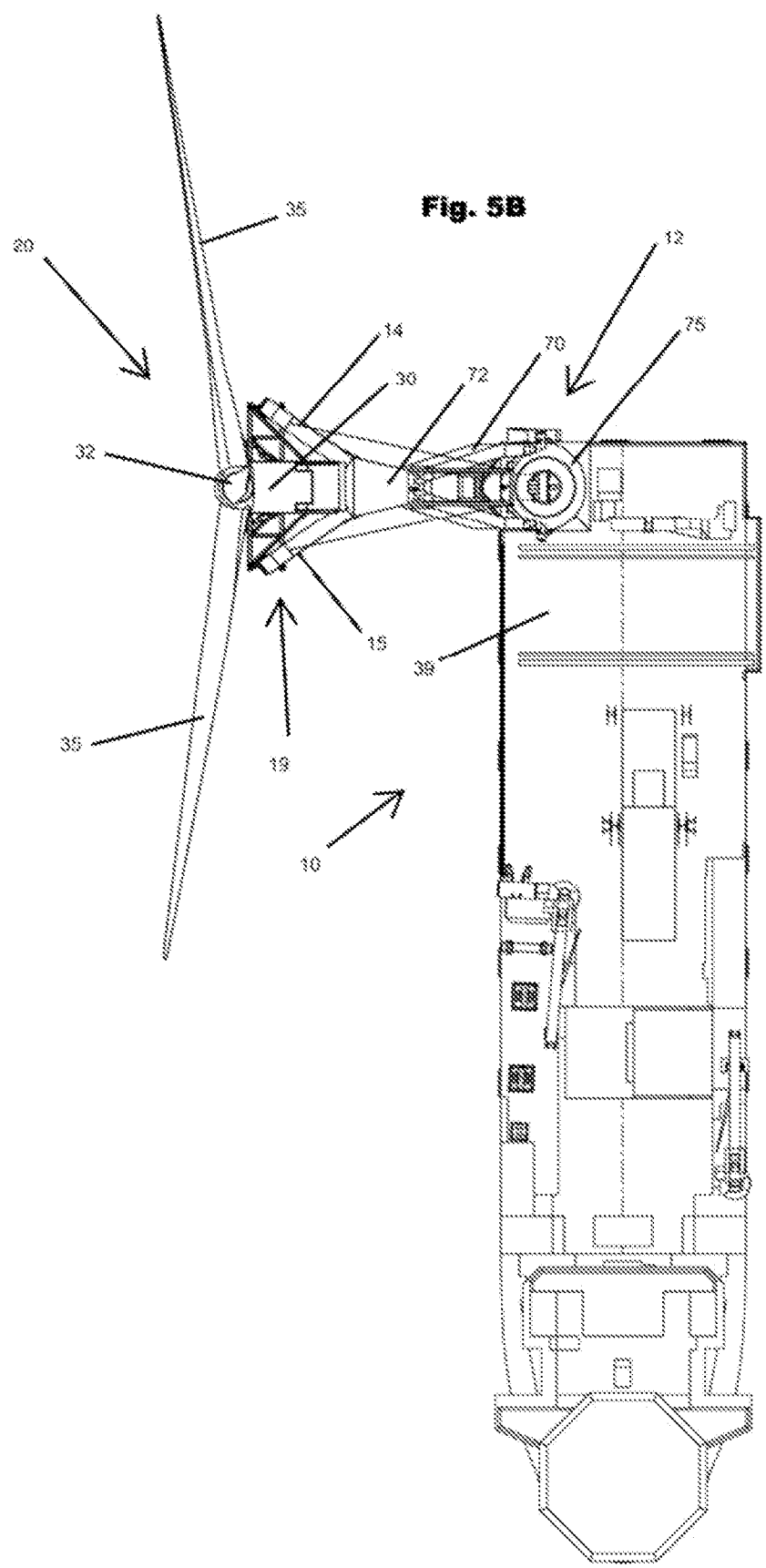

SPLIT CRANE FOR INSTALLATION OF WIND TURBINES AND OTHER TALL STRUCTURES

FIELD OF THE INVENTION

The invention relates to a method of installing a tall structure, in particular a part of a wind turbine, at a target location at sea. The present invention also relates to an installation vessel comprising at least one crane and to a combination of the installation vessel and the tall structure. The present invention also relates to a crane.

BACKGROUND OF THE INVENTION

The energy consumption of the past, present and future shows an ever increasing upward trend. Where in the past energy production has relied mostly on fossil fuels, the focus shifts more and more towards renewables. Climate change and the advancing technology in renewables, which result in a lower price per unit of energy, are driving factors in this trend. The development of wind turbines is a good example.

The potential of wind turbines is high, and continues to rise. This is reflected by the general tendency that wind turbines have ever increasing dimensions. The total power of a single wind turbine has increased from 1 megawatt to 12 megawatts in recent years, with associated increasing dimensions, and further increases in size are to be expected. This increase in size has as a consequence that locations offshore become more favourable than locations onshore. Large offshore wind turbines (12 MW) which are currently being installed or being developed may have blades having a length greater than 100 m. As a consequence, the height of the support structure of the wind turbine, i.e. the mast and the foundation, increases proportionally.

Installing the increasingly tall support structures with currently available installation vessels poses several challenges.

In order to lift the support structure from the deck of the vessel, there has to be a crane which extends beyond the height of the support structure. Existing installation vessels however often comprise cranes which are lower than the height of the support structure to be lifted, because they are not designed with said large wind turbine dimensions in mind. Increasing the height of said cranes to beyond the height of the support structure requires extensive and costly modifications. Replacing the existing cranes with new, higher cranes is even more expensive. Also, higher cranes may have a negative effect on the stability of the vessel due to the upward shift of the centre of gravity of the vessel.

Instead of increasing the height of existing crane, the shortage in height of the crane relative to the height of the support structure can be compensated by using two cranes. Such a method requires the two cranes to support the support structure in-between said cranes. This way, the support structure thus can extend to above the height of the two cranes. A disadvantage of this method is that it requires two cranes instead of one, and is therefore costly. A second disadvantage is that two cranes take up more deck space compared to one crane.

Yet another disadvantage of the two crane method is the way of stabilizing the support structure during lifting. Due to the independent movement relationship between the two cranes, only vertical lift rigging is possible. Rigging the support structure in a horizontal direction is difficult. In addition, synchronously moving the two individual cranes is complex.

Furthermore, safety issues are important. Offshore installation methods generally carry a certain risk for personnel, and this risk should be minimized.

Also, the water depth at which wind turbines at sea are installed has increased over the years.

All these considerations make it quite difficult to create an installation method which is simple, fast, safe and at the same time cost-efficient.

KR101790970 discloses an installation vessel for lifting a tall structure part of a tall structure, in particular a wind turbine, which is to be installed at a target location at sea. The installation vessel comprises at least one crane. An upper part of the crane comprises two "boom parts", with a space between them. The boom parts are very short and the wind turbine is not located between these boom parts.

The crane uses a lifting frame which is forked and is called a lifting fork. The lifting frame has a left projection and a right projection. The lifting frame is supported by cables only and is thus not a part of the crane itself. The installation vessel of KR 101790970 is complex and has many degrees of freedom, resulting in a difficult operation and substantial risk of collision of the load with the crane or the lifting frame with the crane.

WO0214144 discloses a vessel provided with a deck and with a device for removing and/or installing a sub-structure of a drilling or production platform, wherein said device comprises a supporting structure which is capable of tilting movement in a direction transversely to an edge of the deck and hoisting means connected to said supporting structure for hoisting said sub-structure.

CN101468774 discloses a hoisting auxiliary structure for a wind powered generator, which comprises a holding part and two hanging parts, wherein the hanging parts are positioned at two sides of the holding parts respectively and are connected and fixed with the holding part through diagonal bars.

OBJECT OF THE INVENTION

It is an object of the invention to provide an installation method and an installation vessel for installing tall wind turbines at sea which is fast, safe, reliable and cost-effective.

It is a further object of the invention to provide an installation method and an installation vessel with which a complete, tall wind turbine can be installed at sea, in particular including the foundation of the wind turbine.

SUMMARY OF THE INVENTION

In order to achieve at least one object, the invention provides a method for installing a wind turbine or other tall structure at a target location at sea, the method comprising:
  providing an installation vessel comprising at least one crane, wherein the crane comprises a lower boom part, a right boom part, and a left boom part, wherein the right boom part and the left boom part are connected to an upper portion of the lower boom part and extend from said upper portion, wherein a space is present between the right and left boom part,
  lifting a tall structure part, in particular the nacelle assembly, with the crane, wherein in top view the tall structure part is supported at least partially between the right and left boom part by one or more hoist lines extending from the right and left boom part to the tall structure part.

The split crane advantageously allows a tall structure part to extend to the uppermost part of the crane or to a location which is higher than the uppermost part of the crane. The crane can hold the tall structure part in a stable manner.

In an embodiment, the tall structure part is a nacelle assembly which comprises a nacelle and a hub and:
- a mast or part thereof extending downward from the nacelle and/or
- one or more blades connected to the hub and extending over a vertical distance upwardly or downwardly from the nacelle,
- wherein when seen in top view the nacelle, the mast or part thereof is held between the right and left boom part.

The present method is in particular suitable to install tall parts of a wind turbine. Wind turbines become higher and higher and this method allows the crane to be somewhat lower than if the crane would need to extend to above the height of the nacelle of the wind turbine in its final position on the wind turbine mast.

The right boom part and the left boom part may extend outwardly away from the rest of the crane, more in particular from the lower boom part. This way, the tall structure part can extend between—and be supported by—the right and left boom part while maintaining a distance between the tall structure part and the rest of the crane. The right boom part and the left boom part can be considered to form an extension of the lower boom part.

In an embodiment, a lifting frame is connected to the tall structure part at a position below the right and left boom part, and wherein one or more hoist lines extend from the right and left boom part to the lifting frame, and wherein the tall structure part extends upwards from the lifting frame to a location between the right and left boom part or above the right and left boom part. The lifting frame allows the tall structure part to be lifted at a relatively low position, which is advantageous in order to limit the forces in the lines.

The tall structure part may be a nacelle assembly comprising the nacelle and the mast or a part of the mast of the wind turbine, the mast or part thereof extending downward from the nacelle, and wherein the lifting frame is connected to the mast or part thereof below the nacelle.

In an embodiment, a stabilizing device is provided between the right and/or left boom part and the stabilized part of the tall structure part which is located above the lifting frame, wherein the one or more hoist lines carry the weight of the tall structure part, in particular the nacelle assembly, and wherein the stabilizing device holds the tall structure part upright.

The stabilizing device provides stability to the tall structure part.

The stabilizing device may be configured to allow an upward and downward movement of the tall structure part.

The stabilizing device may comprise:
- one or more stabilizing lines which extend from the right and left boom part to the stabilized part above the lifting frame, and/or
- a clamp which is connected to the right and/or left boom part and which is positioned between the right and left boom part, wherein the clamp holds the stabilized part of the tall structure part above the lifting frame, and/or
- one or more cylinders which extend from the right and left boom part to the stabilized part of the tall structure part above the lifting frame, wherein the one or more cylinders are extended or shortened to stabilize the tall structure part.

In case the stabilizing device comprises a clamp, the clamp may comprise a through opening which extends vertically, and wherein a part of the tall structure part extends through the through opening. This advantageously provides a simple stabilizing device, and may allow the tall structure part to slide through the clamp.

The nacelle of the nacelle assembly may be supported at a horizontal level of the right and left boom part or above the right and left boom part. This further increases the maximum height of the tall structure part which is to be lifted.

In an embodiment, the tall structure part is a nacelle assembly comprising a nacelle, a hub and blades, and wherein when seen in top view the hub and the blades protrude over a horizontal distance forward of the right and left boom part and stay clear of the right and left boom part. The forward protrusion prevents the blades from hitting the crane.

Typically, the nacelle assembly is transferred from a support position on board the installation vessel to the foundation, to the mast, or to a lower part of the mast at the target location. Alternatively, the nacelle assembly may be transferred from a barge or other auxiliary vessel.

In an embodiment, the crane comprises at least a right hoisting system for hoisting the portion of the load suspended from the right boom part and a left hoisting system for hoisting the portion of the load suspended from the left boom part and wherein the right and left hoisting system cooperate in the lifting operation. This allows the tall structure part to be controlled effectively.

The crane may initially comprise a single upper boom part, wherein the single upper boom part is removed and replaced by the right and left boom part prior to the lifting operation. This allows a regular crane to be used for this specific purpose.

In an embodiment, the crane comprises a junction at an upper end of the lower boom part wherein the right and left boom part extend from the junction. It was found that this overall configuration provides a practical solution.

In an embodiment, the junction is located at 50 to 95 percent of a total height of the crane, preferably at 70 to 95 percent of the total height of the crane.

The right boom part and the left boom part may be pivotably mounted to the junction via a right and left hinge, and wherein the angle enclosed between the right and left boom part is adjusted by pivoting the right and/or left boom part.

In an embodiment, when seen in side view the tall structure part extends partly above and partly below a left boom part free end and a right boom part free end of the respective left and right boom parts, and at least partly between the boom part free ends and the junction.

In an embodiment, the left boom part and the right boom part are identical and mirrored with respect to each other.

The present invention further relates to an installation vessel configured for lifting a tall structure part, in particular a nacelle assembly, of a tall structure, in particular a wind turbine, which is to be installed at a target location at sea, the installation vessel comprising at least one crane, wherein an upper part of the crane comprises two boom parts, a right boom part and a left boom part, wherein a space is present between the right and left boom part, and wherein the space is configured for accommodating the tall structure part, in particular a nacelle assembly of a wind turbine.

The installation vessel comprises the same advantages as the method according to the invention.

In an embodiment, the installation vessel, comprises a lifting frame configured to be connected to a lower portion of the tall structure part.

In an embodiment, the installation vessel comprises a stabilizing device provided between the right and left boom part and a stabilized part of the tall structure part which is located above the lifting frame, wherein the stabilizing device is configured to hold the tall structure part upright.

In an embodiment, the stabilizing device comprises:
- one or more stabilizing lines which extend from the right and left boom part to the stabilized part of the tall structure part, and/or
- a clamp which is configured to be connected to the right and/or left boom part and which is positioned between the right and left boom part, and/or
- one or more cylinders are connected to the right and/or left boom part and are configured to extend to the stabilized part of the nacelle assembly above the lifting frame.

In an embodiment, the lifting frame has a right side and a left side, wherein a hoist line extends from the right boom part to the right side and wherein a hoist line extends from the left boom part to the left side of the frame.

In an embodiment, the left and right boom part are connected to the base of the crane via a hinge, either directly or indirectly via another crane part which is connected to the base of the crane by said hinge, in particular the lower boom part, allowing the left and right boom part to pivot upward and downward. In a further embodiment, the left and right boom part extend upwards and/or outwards from the point where they are mounted to the crane. In a further embodiment, the crane comprises a single lower boom part and a junction at an upper end of the lower boom part wherein the right and left boom part extend from the junction.

In an embodiment, the right and left boom part extend over a vertical distance and over a horizontal distance from the junction.

In an embodiment, the junction is located at 50 to 95 percent of a total height of the crane, preferably at 70 to 95 percent of the total height of the crane.

In an embodiment, the left and right boom part are pivotable up and down together with the lower boom part.

In an embodiment, the crane comprises a tower. In a further embodiment, the crane comprises lower boom cables that extend from the tower to the boom, in particular to the lower boom part. In a further embodiment, the crane comprises a left upper boom cable that extends from a left upper boom cable connection point on a part of the crane to the left boom part and a right upper boom cable that extends from the right boom part to a right upper boom cable connection point on a part of the crane. In yet a further embodiment, the crane comprises an upper boom cable guide that supports the upper boom cables at a distance from the boom parts to increase the load bearing strength and stiffness of the combination of the lower boom part and the left and right boom part.

In an embodiment, the crane comprises at least a right hoisting system for hoisting the portion of the load suspended from the right boom part and a left hoisting system for hoisting the portion of the load suspended from the left boom part.

In an embodiment, the right and left hoisting system are independently operable.

In an embodiment, the right and left hoisting system comprise a load balancing device for balancing the load between the right and left hoisting system.

In an embodiment, the crane comprises a turret base, and wherein the turret base is mounted for rotation about a vertical axis on the deck or hull of the installation vessel. In this embodiment, the upper boom cables are connected to the crane part other than the right and left boom part at their lower end such that the upper boom cable connection points rotate along the vertical axis together with the turret base.

In an embodiment, the right and left boom part define a V-shape.

In an embodiment, the right and left boom part comprise respective right and left free ends which are not interconnected by any beam.

In an embodiment, an open space is provided between the right and left free ends of the respective right and left boom parts.

In an embodiment, a distance between right and left free ends of respective right and left boom parts is between 1.5 and 12 meters, preferably between 4 and 11 meters, more preferably between 5 and 10 meters.

In an embodiment, the lower boom part is pivotably connected to the turret base via a lower boom hinge and is pivotable about a horizontal lower boom pivot axis about the turret base.

In an embodiment, the junction is pivotably connected to the lower boom part via a junction hinge and pivotable relative to the lower boom part about a horizontal pivot axis. In this embodiment, the upper boom cables are connected to winches to increase and decrease their length in order to allow and/or effect the pivoting action of the upper boom parts around the horizontal axis relative to the lower boom part.

In an embodiment, the right boom part and the left boom part are pivotably mounted to the junction via a right and left hinge, and wherein the angle enclosed between the right and left boom part is adjustable by pivoting the right and/or left boom part. In this embodiment, the upper boom cables may be connected to winches to increase and decrease their length in order to allow the pivoting action of the upper boom parts with respect to the junction.

In an embodiment, the right boom part and the left boom part are removably mounted on the crane and replaceable with a single upper boom part, allowing the crane to be converted.

In an embodiment:
a) the crane is positioned on a bow of the vessel, in particular at a port side or starboard side thereof, and wherein a pickup area where the nacelle assembly is picked up is located aft or to the side of the crane, or
b) wherein the crane is positioned on a stern of the installation vessel, in particular at a port side or starboard side thereof, and wherein a pickup area where the nacelle assembly is picked up is located forward or to the side of the crane, or
c) the crane is positioned somewhere along the length to the vessel and wherein a pickup located on any side of the crane, or
d) Any of the preceding options a)-c) wherein the pick-up area is located on an extension platform of the vessel which cantilevers outboard of the hull of the vessel.

In an embodiment, the left boom part and the right boom part diverge with respect to each other.

In an embodiment, an angle of divergence between the left boom part and the right boom part during lifting is between 10 and 100 degrees, preferably between 45 and 100 degrees.

In an embodiment, the left boom part and the right boom part are identical and mirrored with respect to each other.

The present invention further relates to a combination of the installation vessel according to the invention and a tall structure part, in particular a nacelle assembly.

In an embodiment, when seen in side view the nacelle of the nacelle assembly is supported at the horizontal level of the right and left boom part or above the right and left boom part.

The present invention also relates to the crane without the vessel, wherein the crane is configured for lifting a tall structure part, in particular a nacelle assembly, of a tall structure, in particular a wind turbine, which is to be installed at a target location at sea, wherein an upper part of the crane comprises two boom parts, a right boom part and a left boom part, wherein a space is present between the right and left boom part, and wherein the space is configured for accommodating the tall structure part, in particular a nacelle assembly of a wind turbine.

SHORT DESCRIPTION OF THE FIGURES

Embodiments of the system and the method will be described by way of example only, with reference to the accompanying schematic drawings in which corresponding reference symbols indicate corresponding parts, and in which:

FIG. 4 shows a detailed birds eye view of an upper part of the crane.

FIG. 5B shows a top view of the installation method according to the invention.

DETAILED DESCRIPTION OF THE FIGURES

Figure 1A:
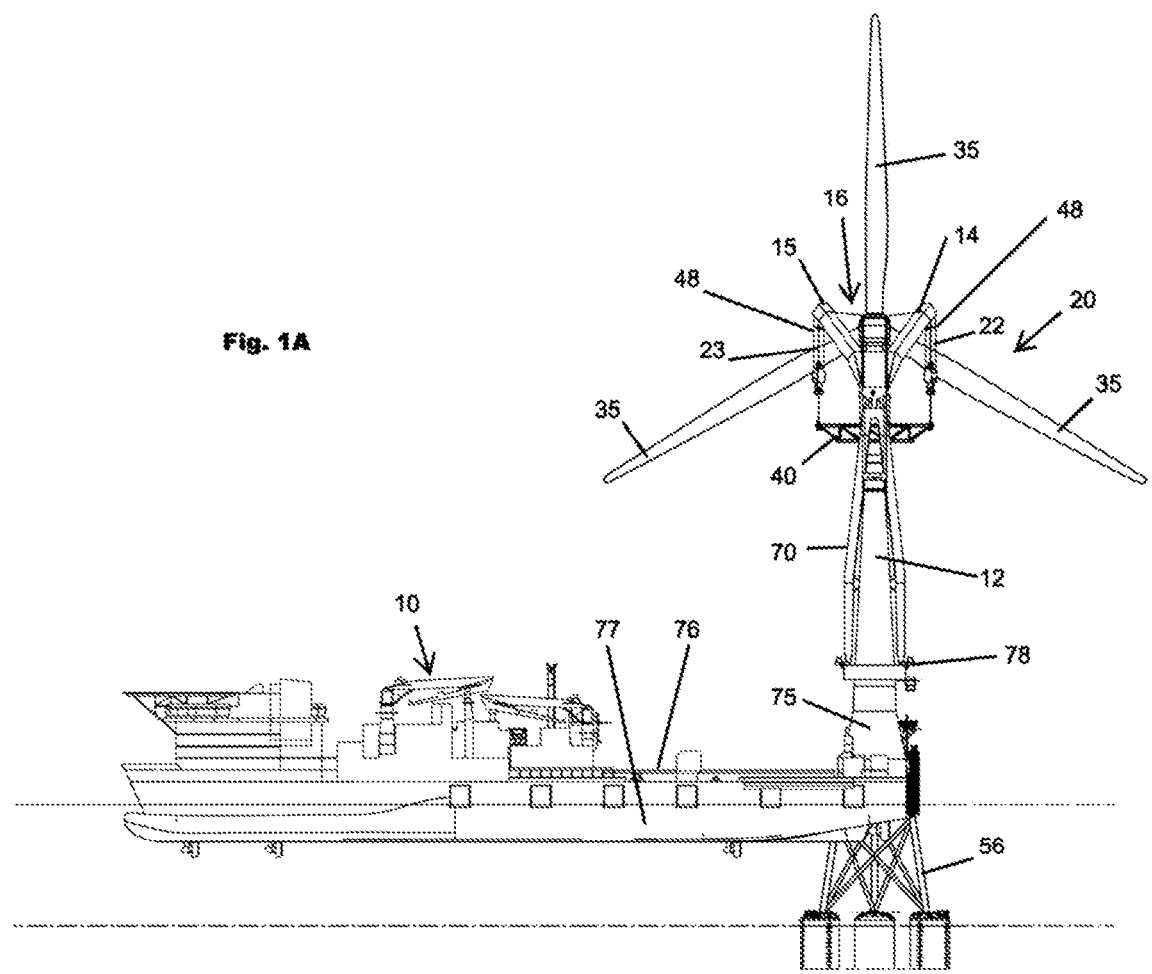
FIG. 1A shows a side view of the installation method according to the invention.
Figure 1B:
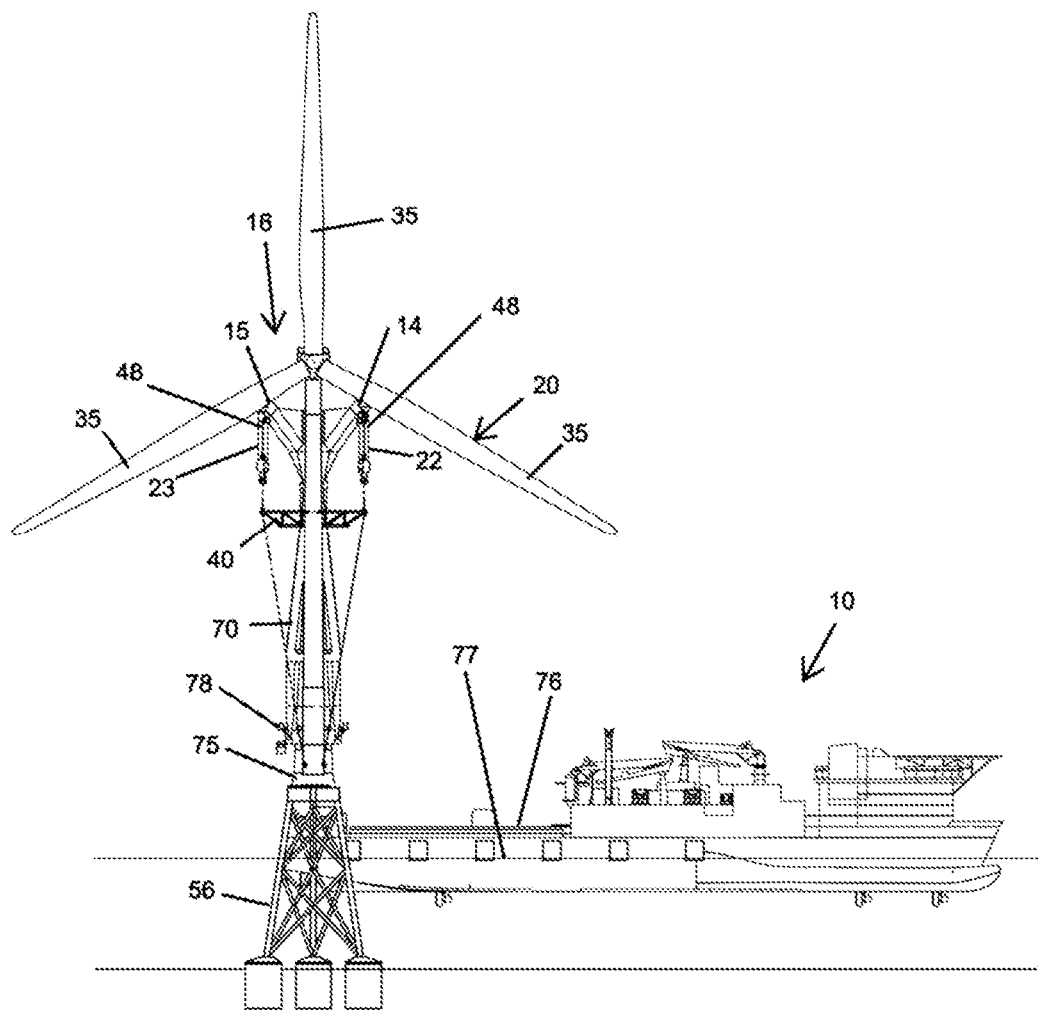
FIG. 1B shows a side view of the installation method according to the invention.

With reference to FIGS. 1-6, the method for installing a wind turbine 18 or other tall structure at a target location 19 at sea comprises providing an installation vessel 10 comprising at least one crane 12. The installation vessel 10 is typically a floating vessel and may be a my submersible vessel or a regular ship shaped vessel, but may also be a jack-up rig. The crane comprises a right boom part 14 and a left boom part 15. A space 16 is present between the right and left boom part. The right and left boom part may define a V-shape but other shapes are possible.

The right and left boom parts 15, 14 comprise respective right and left free ends 58, 59 which are not interconnected by any beam.

An open space is provided between the right and left free ends 59, 58 of the respective right and left boom parts 15, 14.

A distance L1 (FIG. 6) between right and left free ends 59, 58 of respective right and left boom parts 15, 14 is between 1.5 and 12 meters, preferably between 4 and 11 meters, more preferably between 5 and 10 meters.

The left boom part 15 and the right boom part 14 diverge with respect to each other.

An angle of divergence a (FIG. 6) between the left boom part and the right boom part during lifting is between 10 and 100 degrees, preferably between 45 and 100 degrees.

The crane is configured for lifting a tall structure part 20, in particular the nacelle assembly (which is also referred to with the reference numeral 20). In top view the tall structure part is supported at least partially between the right and left boom part 14, 15 by one or more hoist lines 22, 23 extending from the right and left boom part to the tall structure part 20.

The tall structure part 20 is typically a nacelle assembly comprising a nacelle 30 and a hub 32, and a mast 34 or part thereof extending downward from the nacelle. The nacelle assembly may further comprise one or more blades 35 connected to the hub 32 and extending over a vertical distance upwardly or downwardly from the nacelle.

The nacelle assembly may comprise only the nacelle and the mast or parts thereof, only the nacelle and the one or more blades, or be a combination of the nacelle, the mast or parts thereof and blade.

The difference between the FIGS. 1A, 2A, 3A, 5A and 1B, 2B, 3B, 5B is that in the latter figures indicated with #B the tall structure part, in particular the nacelle assembly, is located completely above free ends 58, 59 of the right and left boom parts 58, 59. The other features are substantially the same.

When seen in top view the nacelle, the mast or part thereof is held between the right and left boom part.

A lifting frame 40 is connected to the tall structure part 20 at a lifting position 42 below the right and left boom part, and wherein one or more hoists lines extend from the right and left boom part to the lifting frame. The tall structure part extends upwards from the lifting frame 40 to a location between the right and left boom part or to above the right and left boom part.

The lifting frame 40 has a right side 44 and a left side 45, wherein a hoist line 22 extends from the right boom part to the right side 44 and wherein a hoist line 23 extends from the left boom part to the left side of the frame When the tall structure part is a nacelle assembly comprising the nacelle and the mast or a part of the mast of the wind turbine, the mast or part thereof may extend downward from the nacelle, and the lifting frame is connected to the mast 34 or part thereof below the nacelle.

The nacelle 30 of the nacelle assembly 20 is supported at a horizontal level of the right and left boom part or above the right and left boom part.

When seen in top view the hub and the blades protrude over a horizontal distance 38 forward of the right and left boom part and stay clear of the right and left boom part.

In the method according to the invention, the nacelle assembly 20 is transferred from a support position 39 on board the installation vessel to the foundation 56, to the mast or a lower portion 57 thereof, at the target location 19.

The crane 12 comprises at least a right hoisting system 48 for hoisting the portion of the load suspended from the right boom part and a left hoisting system 49 for hoisting the portion of the load suspended from the left boom part and wherein the right and left hoisting system cooperate in the lifting operation. The right and left hoisting system 48, 49 each comprise a winch, in other words a right winch a left winch. A single control device may control both the right winch and the left winch. 100. The right and left hoisting system may be independently operable. The right and left hoisting system may comprise a load balancing device for balancing the load between the right and left hoisting system.

The crane 12 comprises a lower boom part 70 and a junction 72 at an upper end 73 of the lower boom part. The right and left boom part 14, 15 extend from the junction 72. The right and left boom part 14, 15 extend over a vertical distance and over a horizontal distance from the junction 72. In side view, the left and right boom part extend upwards and/or outwards from the junction 72.

The junction 72 is located at 50 to 95 percent of a total height 80 of the crane 12, preferably at 70 to 95 percent of the total height of the crane, as shown in FIG. 2.

Figure 2A:
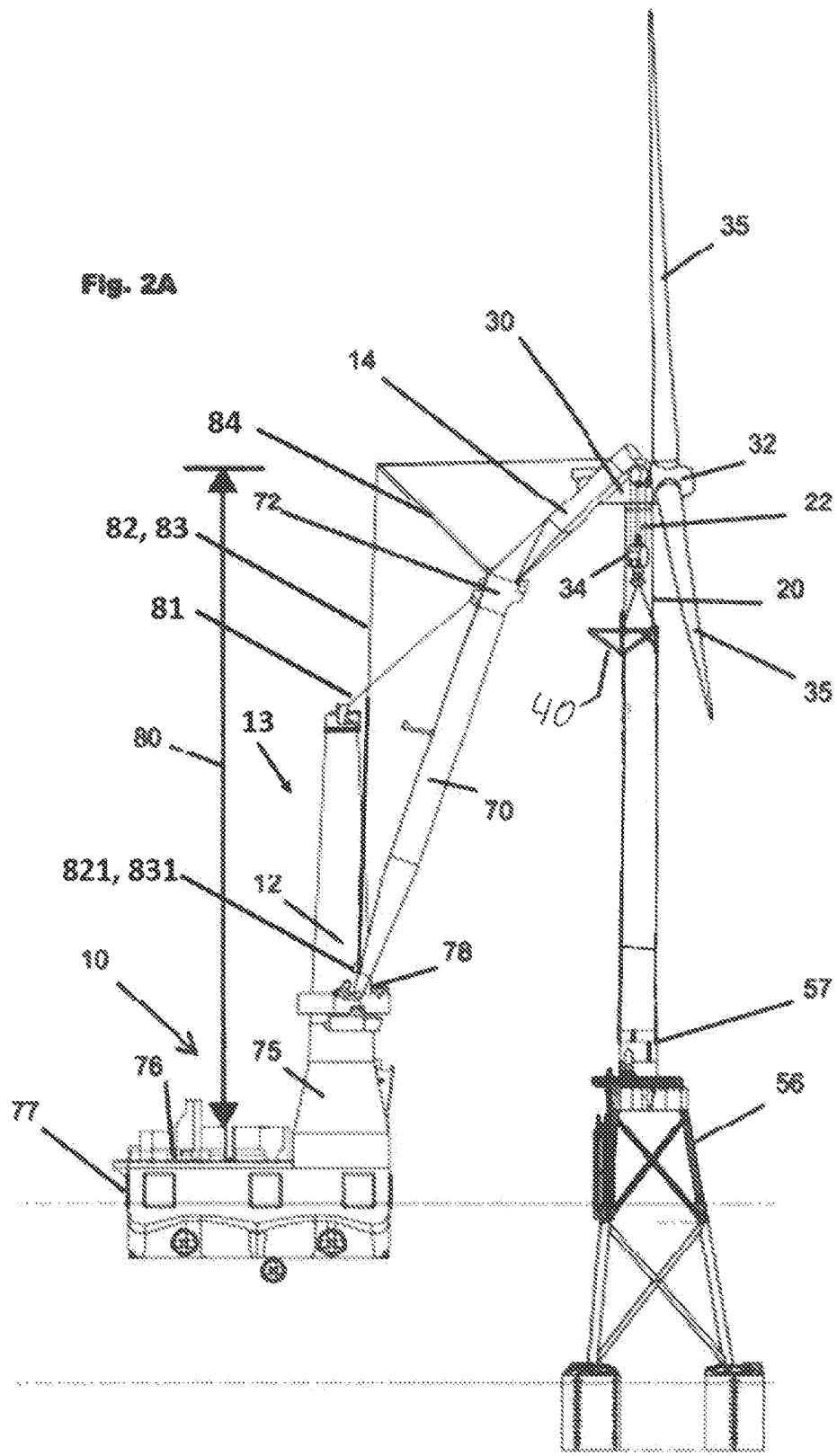
FIG. 2A shows another side view of the installation method according to the invention.
Figure 2B:
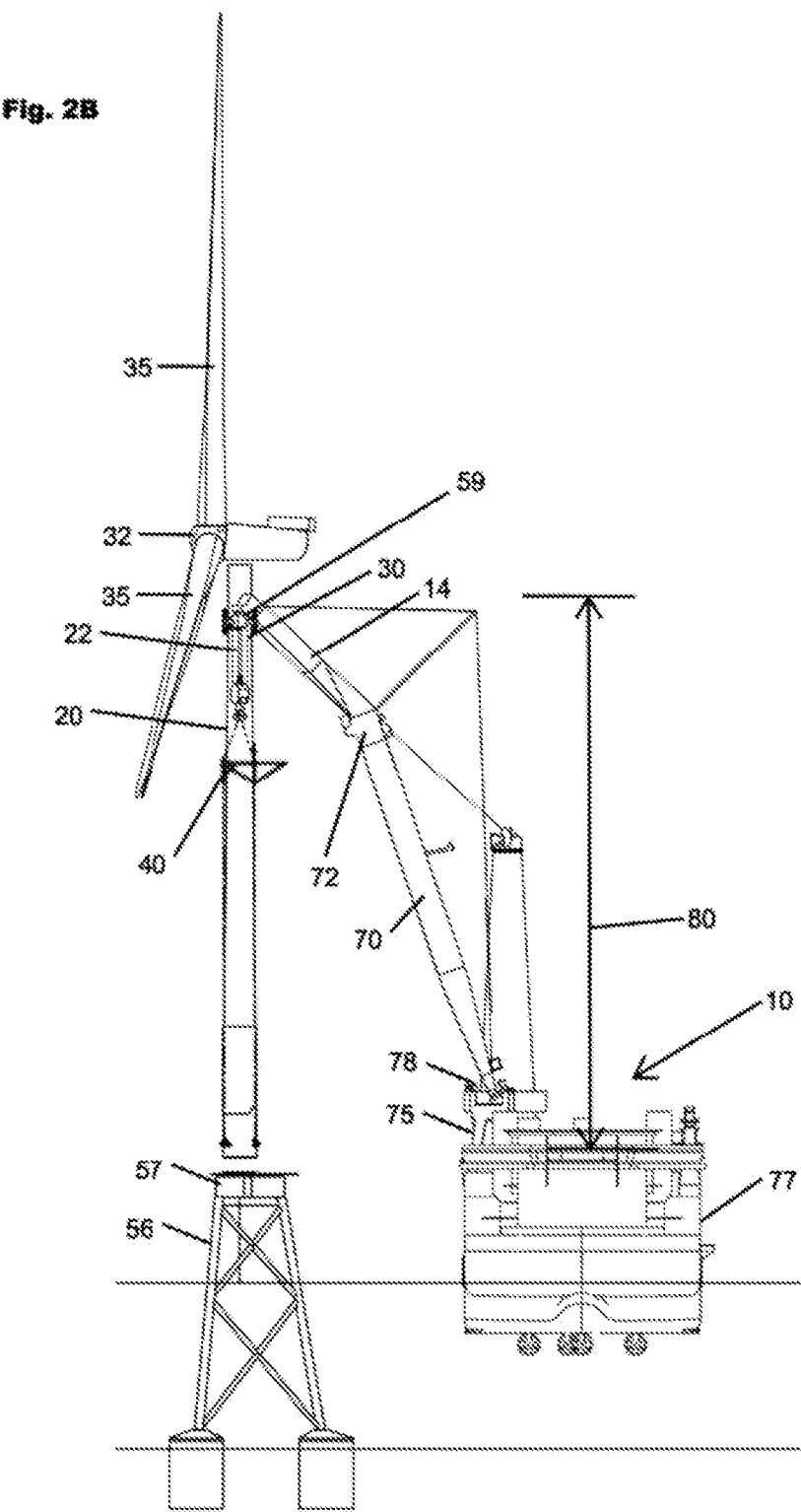
FIG. 2B shows another side view of the installation method according to the invention.
Figure 3A:
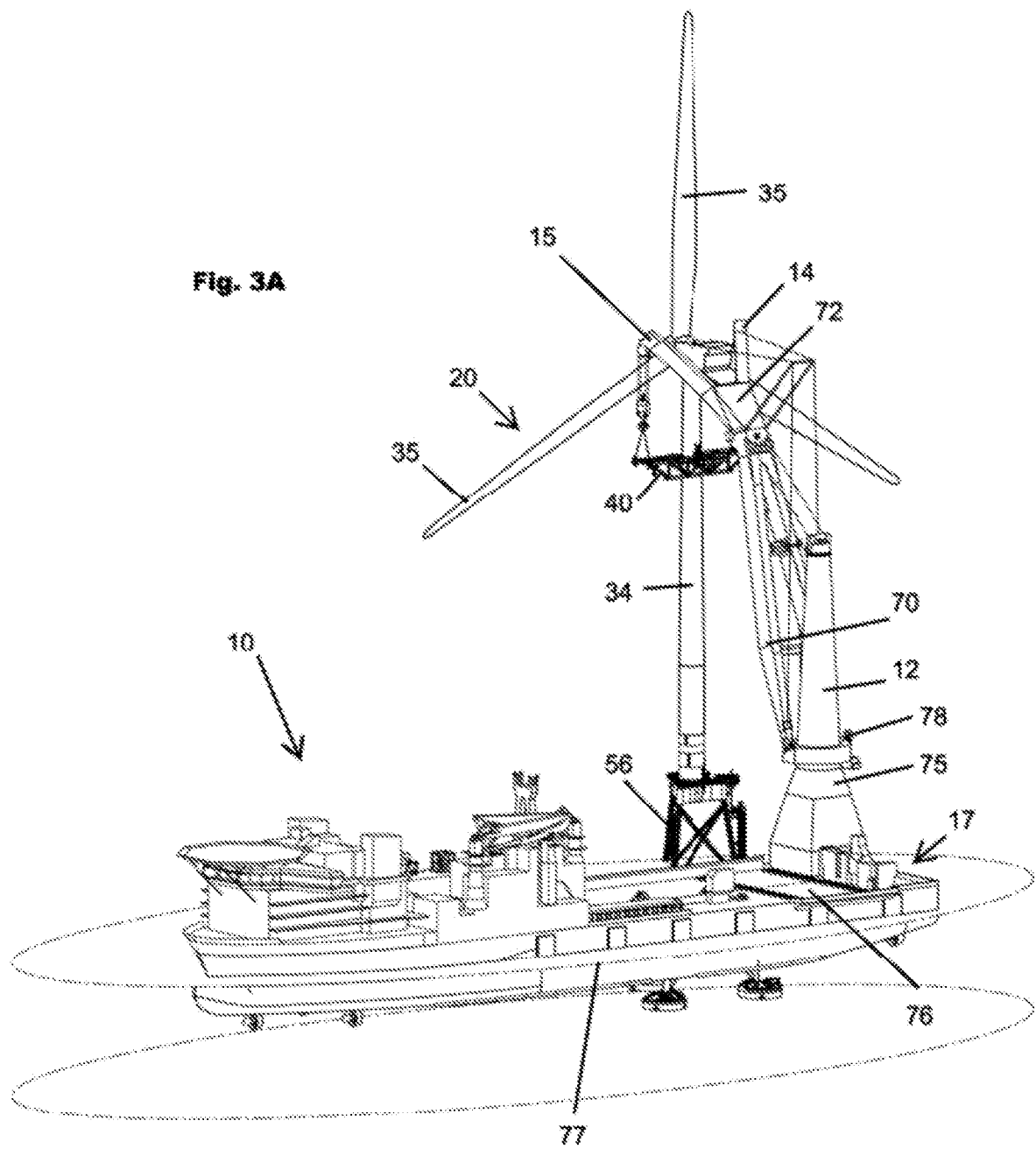
FIG. 3A shows a birds eye view of the installation method according to the invention.
Figure 3B:
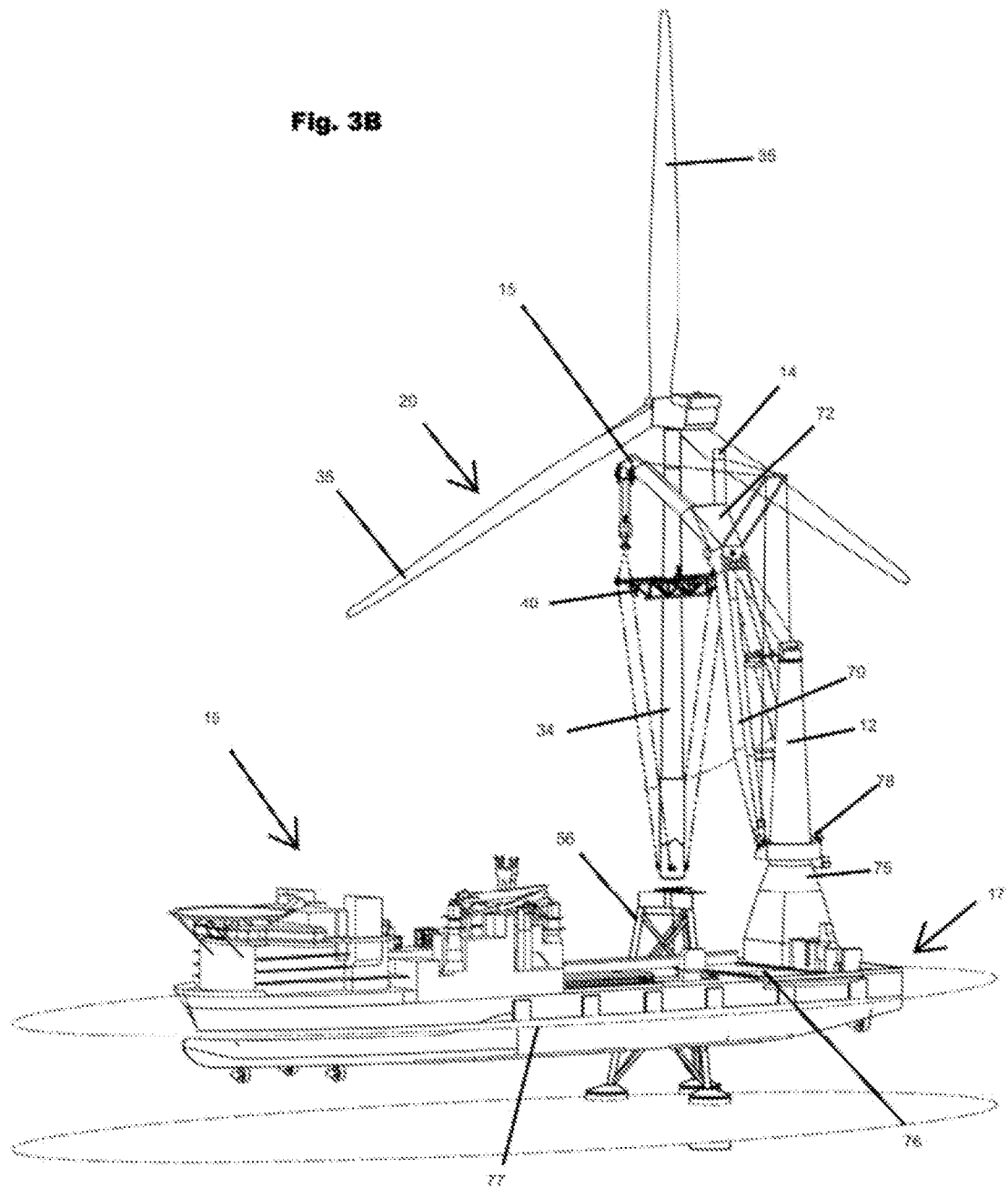
FIG. 3B shows a birds eye view of the installation method according to the invention.
Figure 5A:
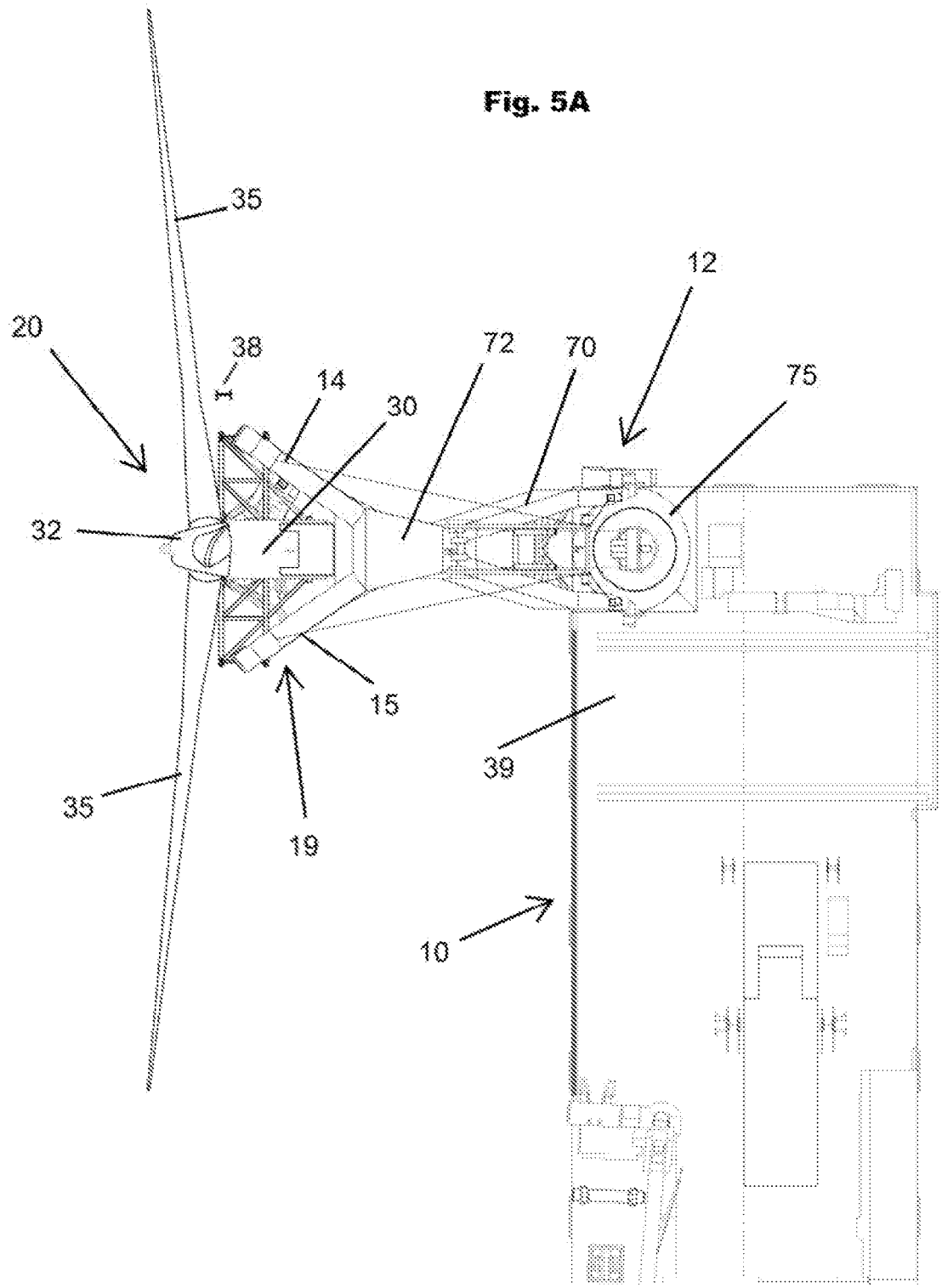
FIG. 5A shows a top view of the installation method according to the invention.
Figure 6:
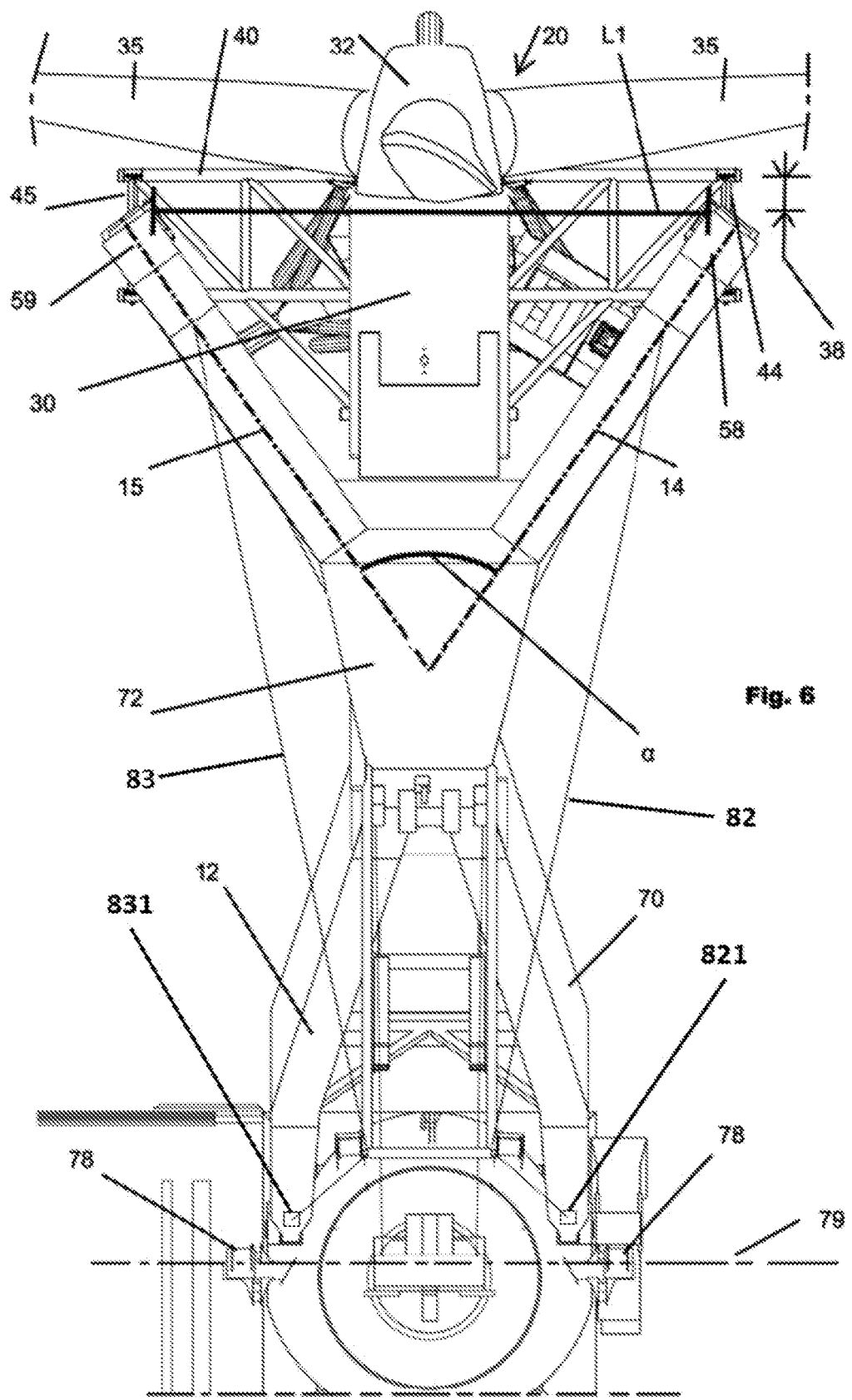
FIG. 6 shows a detailed top view of the crane holding a nacelle assembly.

FIG. 2B also shows in side view the tall structure part extending partly above and partly below a left boom part free end 59 and a right boom part free end 58 of the respective left and right boom parts 15, 14. The tall structure also extends at least partly between the boom part free ends 59, 58 and the junction 52.

The left boom part 15 and the right boom part 14 are identical and mirrored with respect to each other.

The crane may initially comprise a single upper boom part, wherein the single upper boom part is removed and replaced by the right and left boom part prior to the lifting operation.

The crane comprises a vertical tower 13 which comprises a turret base 75, and wherein the turret base is mounted for rotation about a vertical axis on the deck 76 or hull 77 of the installation vessel.

The lower boom part 70 is pivotably connected to the turret base 75 via lower boom hinge 78 and is pivotable about a horizontal lower boom pivot axis 79 about the turret base. As can be seen in e.g. FIG. 3A, the lower boom part is forked at its lower end, where the two sides of the fork attach to the turret base at hinge 78. The hinge 78 consists of two hinge parts, one at each side of the fork. The left and right boom part are pivotable together with the lower boom part.

The crane comprises lower boom cables 81 that extend from the tower 13 to the boom, in particular to the lower boom part 70. The crane further comprises a right upper boom cable 82 that extends from a part of the crane to the right boom part 14 and a left upper boom cable 83 that extends from a part of the crane to the left boom part 15. The crane comprises an upper boom cable guide 84 that supports the upper boom cables 82, 83 at a distance from the boom parts to increase the strength and stiffness of the combination of the lower boom part and the left and right boom part. Cables 81, 82, and 83 are used to control the movement of the boom parts and to transmit forces due to the load that is being lifted by the crane.

The lower boom cables 81 are connected to a winch and control the pivoting movement of the combination of the lower boom part and the left and right boom part relative to the turret, in other words about the lower boom hinges 78 (horizontal lower boom pivot axis 79).

The right and left upper boom cables 82, 83 are connected to the right and left upper boom cable connection points 821, 831, respectively. In the imaged embodiments, the right and left upper boom cable connection points are connected to the lower boom part. This advantageously ensures that the tension or length of the upper boom cables 82, 83 does not change due to movement of the lower boom part, including rotation of the lower boom part around the vertical axis and the horizontal axis 79. Winches to control the length of the right and left upper boom cables 82, 83 may be positioned for example in the tower 13. The upper boom cables 82, 83 are routed to the winches from the upper boom cable connection points 821, 831. In embodiments where the upper boom parts cannot move with respect to the lower boom part, tensioning means instead of winches may be used. The right and left upper boom cables 82, 83 carry a significant portion of the load.

In some embodiments the upper boom cables may be used to let the left and right boom part pivot about a horizontal pivot axis or substantially horizontal pivot axis relative to the lower boom part. In this way the orientation of the left and right boom part (in side view) can be varied independently from the lower boom part. In this embodiment, the lower ends of the upper boom cables are connected to winches but are mounted such that their length does not change upon tilting of the lower boom part along a horizontal axis, for example by running the upper boom cables over one or more sheaves mounted on or near a lower boom pivot axis and letting the upper boom cables extend from these sheaves to the respective winches. The winches may be positioned inside the tower.

Figure 7:
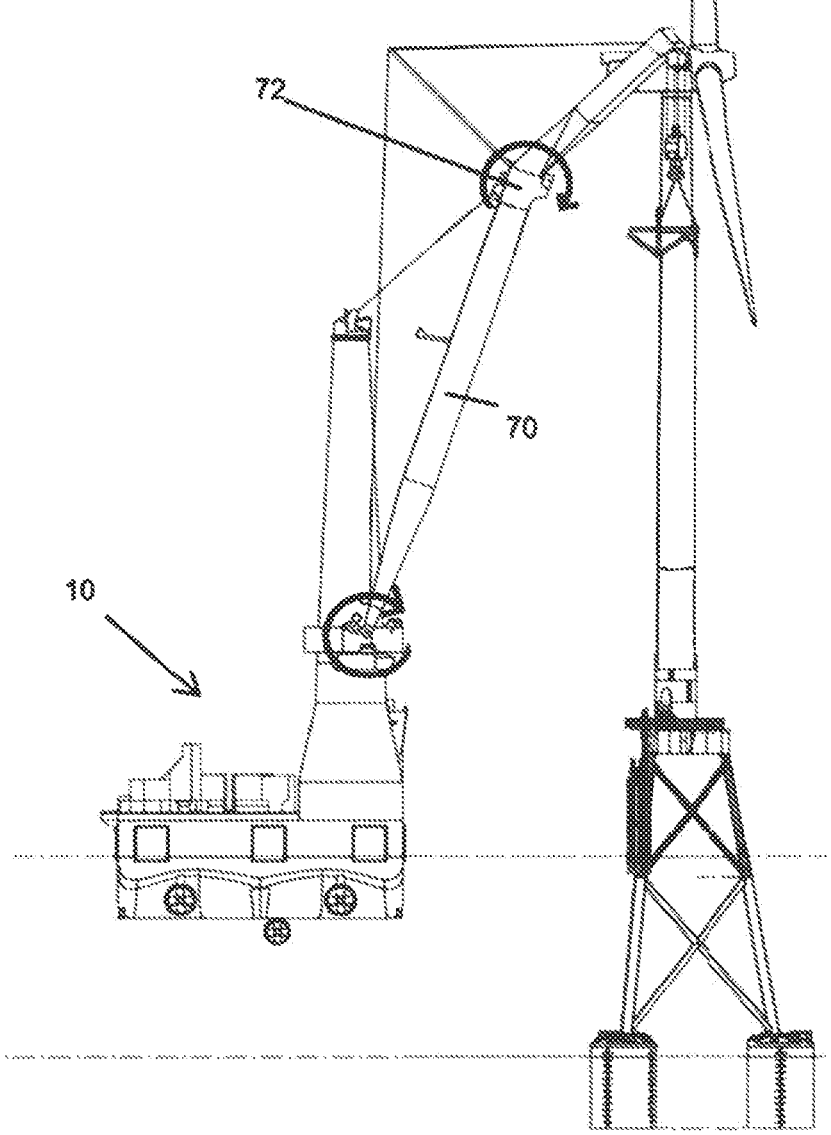
FIG. 7 shows a side view of another embodiment of the invention.
Figure 8:
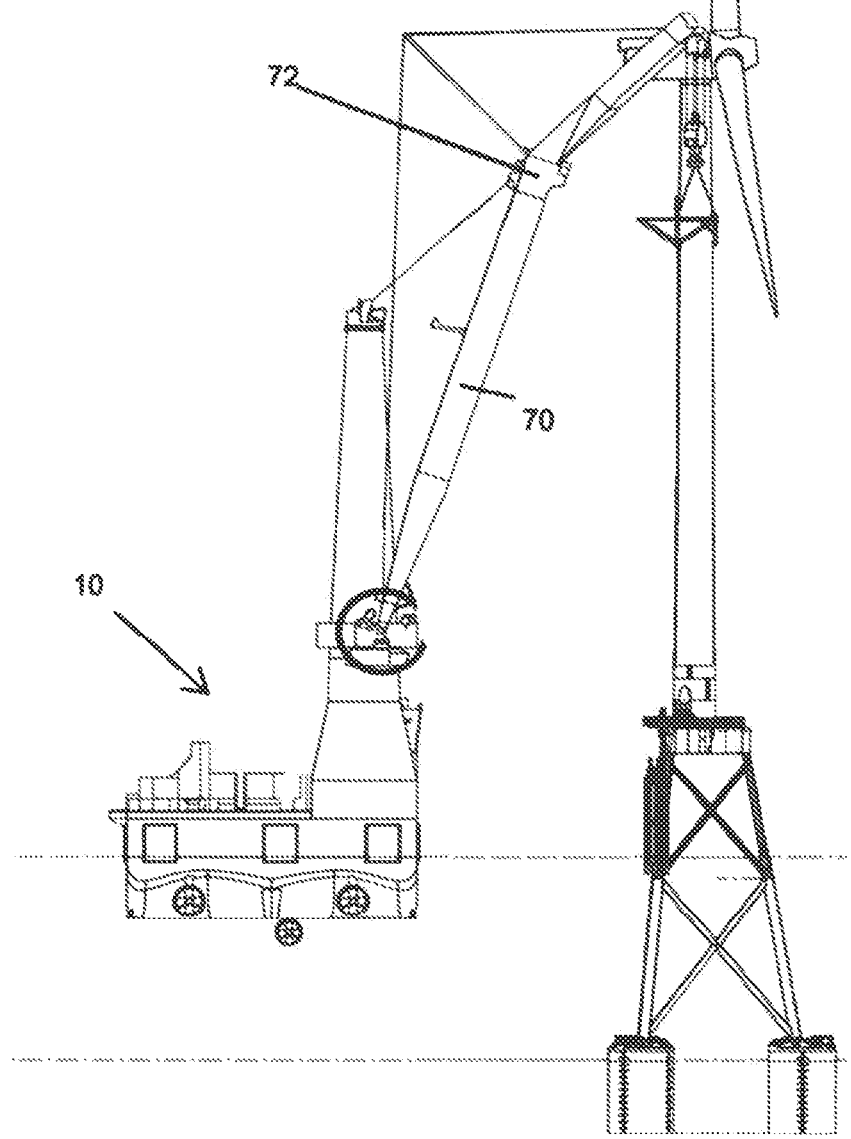
FIG. 8 shows a side view of yet another embodiment of the invention.

Turning to FIG. 7, the junction may be pivotably connected to the lower boom part via a junction hinge and pivotable relative to the lower boom part 70 about a horizontal pivot axis.

The crane 12 is positioned on a stern 17 of the installation vessel, in particular at starboard side thereof. A pickup area where the nacelle assembly 20 is located on the installation vessel prior to the lifting operation may be located forward of the crane 12. Obviously, the crane may also be positioned on the port side. Alternatively, The crane 12 may be positioned on a bow of the vessel, in particular at a port side or starboard side thereof. In such an embodiment, the pickup area will be located after or to the side of the crane 12.

The crane may also be positioned somewhere along the length to the vessel wherein a pickup area is located on any side of the crane.

Alternatively, the crane may be positioned anywhere on the vessel wherein the pick-up area is located on an extension platform of the vessel which cantilevers outboard of the hull of the vessel.

Figure 9:
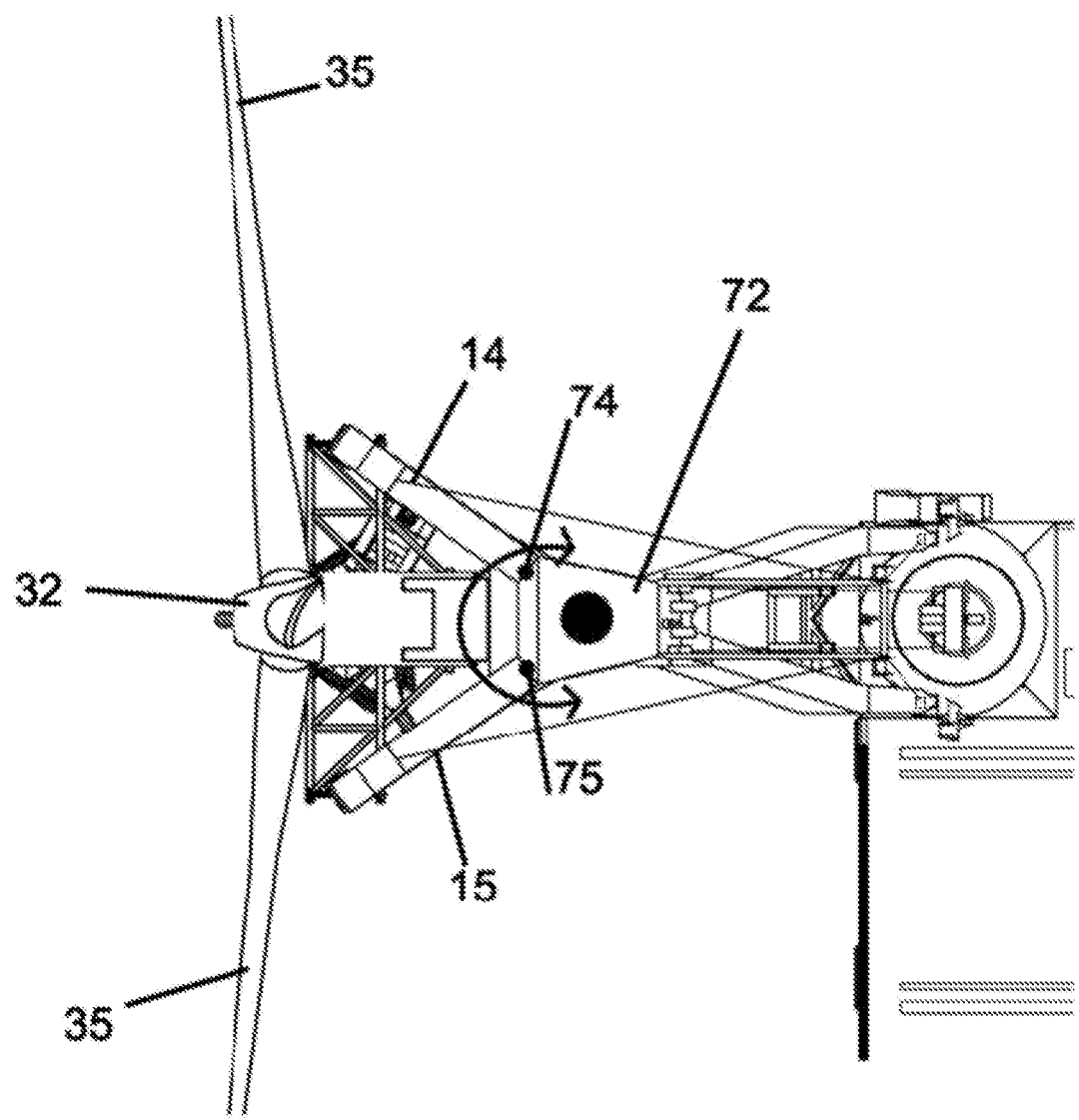
FIG. 9 shows a top view of another embodiment of the invention.
Figure 10:
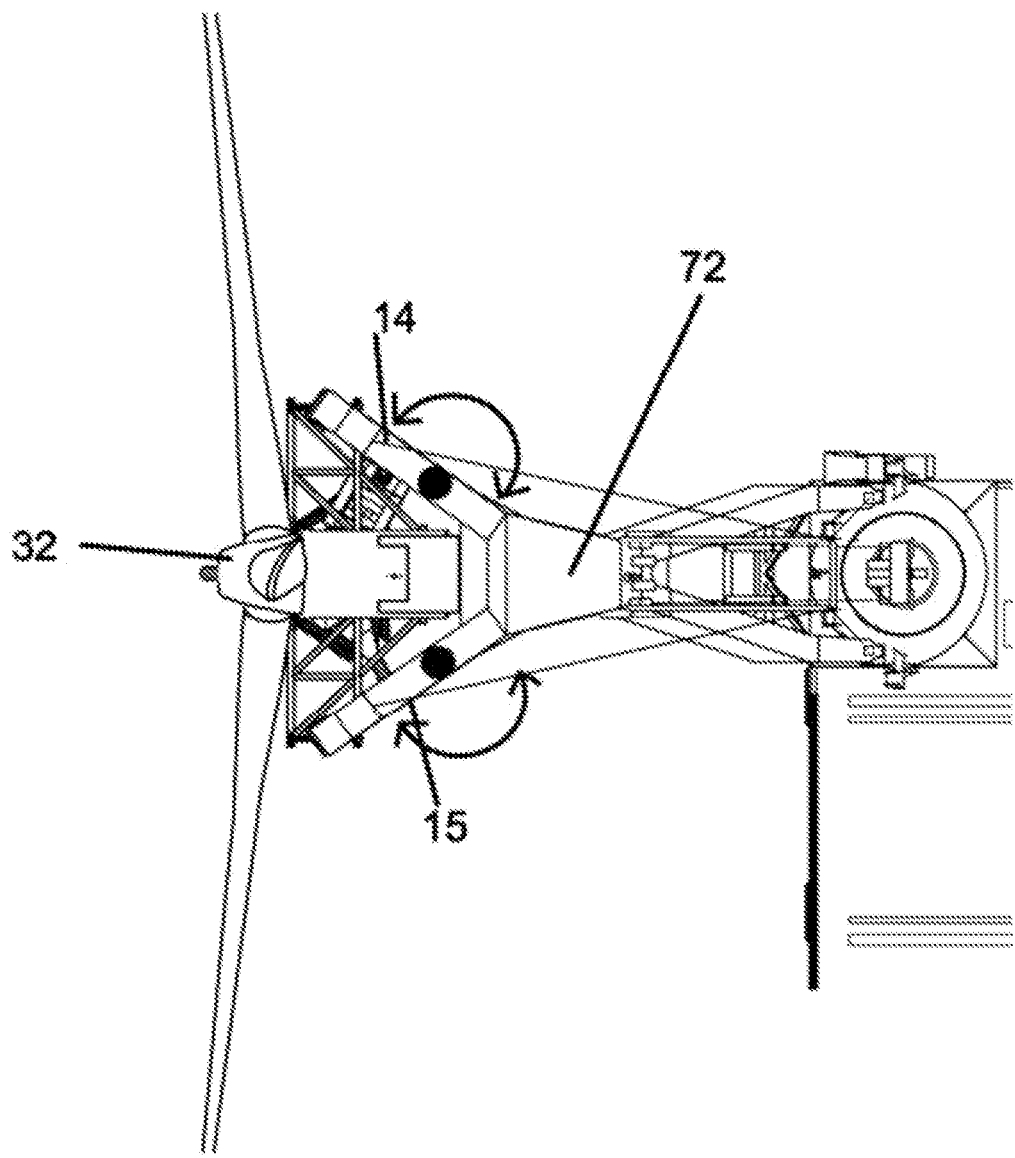
FIG. 10 shows a top view of another embodiment of the invention.

Turning to FIGS. 9 and 10, the right boom part 14 and the left boom part 15 may be pivotably mounted to the junction 72 via a right hinge 74 and a left hinge 75, and wherein the angle enclosed between the right and left boom part is adjusted by pivoting the right and/or left boom part.

Figure 11:
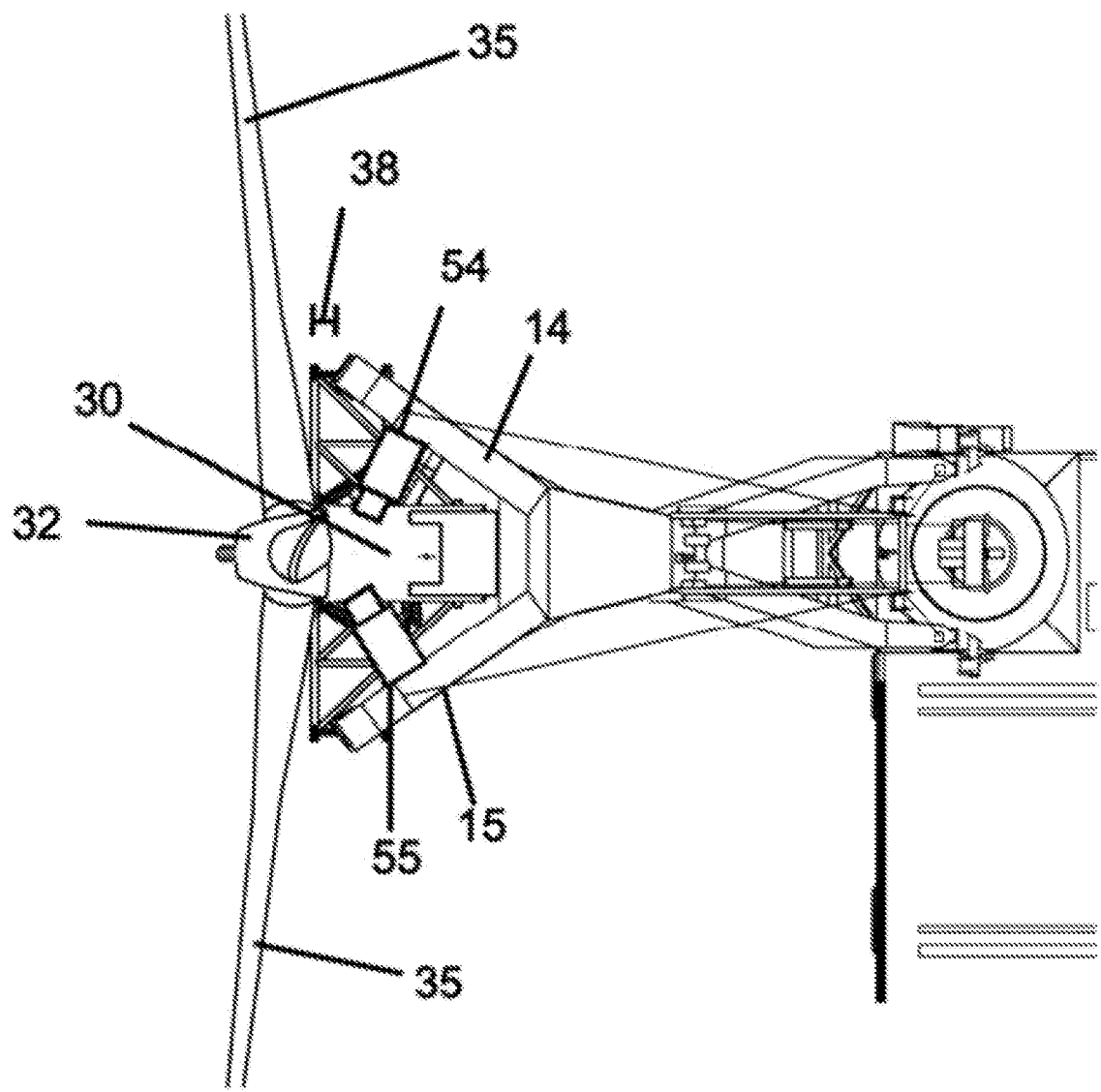
FIG. 11 shows a detailed top view of another embodiment of the invention.

Turning to FIG. 11, a stabilizing device 50 is provided between the right and/or left boom part 14, 15 and a stabilized part 52 of the tall structure part which is located above the lifting frame, in particular between the right and left boom parts. The one or more hoist lines 22, 23 carry the weight of the tall structure part, in particular the nacelle assembly, and the stabilizing device 50 holds the tall structure part upright.

In the embodiment of FIG. 11, the stabilizing device comprises two cylinders 54, 55 which extend from the right and left boom part to the stabilized part of the tall structure part above the lifting frame. During the lifting operation, the one or more cylinders are extended or shortened to stabilize the tall structure part 20.

In another embodiment, the stabilizing device may comprise:
- one or more stabilizing lines which extend from the right and left boom part to the stabilized part above the lifting frame, and/or
- a clamp which is connected to the right and/or left boom part and which is positioned between the right and left boom part, wherein the clamp holds the stabilized part of the tall structure part above the lifting frame.

The clamp may be openable or comprise an opening. The clamp may allow vertical sliding of the tall structure part relative to the clamp.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

This present disclosure relates to the following clauses:

1. Method for installing a wind turbine or other tall structure at a target location at sea, the method comprising:
    providing an installation vessel comprising at least one crane, wherein the crane comprises a right boom part and a left boom part, wherein a space is present between the right and left boom part,
    lifting a tall structure part, in particular the nacelle assembly, with the crane, wherein in top view the tall structure part is supported at least partially between the right and left boom part by one or more hoist lines extending from the right and left boom part to the tall structure part.
2. Method according to preceding clause, wherein the tall structure part is a nacelle assembly comprising a nacelle, a hub, and a mast or part thereof extending downward from the nacelle, with or without one or more blades or parts thereof connected to the hub, the blades extending over a vertical distance upwardly or downwardly from the nacelle, wherein when seen in top view the nacelle, the mast or part thereof is held between the right and left boom part.
3. Method according to any of the preceding clauses, wherein a lifting frame is connected to the tall structure part at a position below the right and left boom part, and wherein one or more hoist lines extend from the right and left boom part to the lifting frame, and wherein the tall structure part extends upwards from the lifting frame to a location between the right and left boom part or above the right and left boom part.
4. Method according to the preceding clause, wherein the tall structure part is a nacelle assembly comprising the nacelle and the mast or a part of the mast of the wind turbine, the mast or part thereof extending downward from the nacelle, and wherein the lifting frame is connected to the mast or part thereof below the nacelle.
5. Method according to any of the two preceding clauses, wherein a stabilizing device is provided between the right and/or left boom part and the stabilized part of the tall structure part which is located above the lifting frame, wherein the one or more hoist lines carry the weight of the tall structure part, in particular the nacelle assembly, and wherein the stabilizing device holds the tall structure part upright.
6. Method according to the preceding clause, wherein the stabilizing device comprises:
    one or more stabilizing lines which extend from the right and left boom part to the stabilized part above the lifting frame, and/or
    a clamp which is connected to the right and/or left boom part and which is positioned between the right and left boom part, wherein the clamp holds the stabilized part of the tall structure part above the lifting frame, and/or
    one or more cylinders which extend from the right and left boom part to the stabilized part of the tall structure part above the lifting frame, wherein the one or more cylinders are extended or shortened to stabilize the tall structure part.
7. Method according to the preceding clause, wherein the clamp comprises a through opening which extends vertically, and wherein a part of the tall structure part extends through the through opening, and wherein in particular the clamp comprises:
    a first and second clamp part which are moveable relative to one another and enable the clamp to be opened in order to release the tall structure part after it has been positioned on the target location or
    an opening on one side allowing the tall structure part to be released from the clamp.
8. Method according to any of the two preceding clauses, wherein the nacelle of the nacelle assembly is supported at a horizontal level of the right and left boom part or above the right and left boom part.
9. Method according to any of the preceding clauses, wherein the tall structure part is a nacelle assembly comprising a nacelle, a hub and blades, and wherein when seen in top view the hub and the blades protrude over a horizontal distance forward of the right and left boom part and stay clear of the right and left boom part.
10. Method according to any of the preceding clauses, wherein the nacelle assembly is transferred from a support position on board the installation vessel to the foundation, to the mast, or to a lower part of the mast at the target location.
11. Method according to any of the preceding clauses, wherein the crane comprises at least a right hoisting system for hoisting the portion of the load suspended from the right boom part and a left hoisting system for hoisting the portion of the load suspended from the left boom part and wherein the right and left hoisting system cooperate in the lifting operation.
12. Method according to any of the preceding clauses, wherein the crane initially comprises a single upper boom part, wherein the single upper boom part is removed and replaced by the right and left boom part prior to the lifting operation.
13. Method according to any of the preceding clauses, wherein the crane comprises a lower boom part and a junction at an upper end of the lower boom part wherein the right and left boom part extend from the junction.
14. Method according to the preceding clause, wherein the junction is located at 50 to 95 percent of a total height of the crane, preferably at 70 to 95 percent of the total height of the crane.
15. Method according to clause 13 or 14, wherein the right boom part and the left boom part are pivotably mounted to the junction via a right and left hinge, and wherein the angle enclosed between the right and left boom part is adjusted by pivoting the right and/or left boom part.

16. Method to any of the preceding clauses where the two hoists are used in combination with more hoists, more specifically three hoists, two hoists in front and one aft of the nacelle assembly or four hoists, two in front and two aft of the nacelle assembly, or more hoists if required.

17. Method according to any of the preceding clauses, wherein in side view the tall structure part extends partly above and partly below a left boom part free end and a right boom part free end of the respective left and right boom parts, and at least partly between boom part free ends and the junction.

18. Method according to any of the preceding clauses, wherein the left boom part and the right boom part are identical and mirrored with respect to each other.

19. Installation vessel configured for lifting a tall structure part, in particular a nacelle assembly, of a tall structure, in particular a wind turbine, which is to be installed at a target location at sea, the installation vessel comprising at least one crane, wherein an upper part of the crane comprises two boom parts, a right boom part and a left boom part, wherein a space is present between the right and left boom part, and wherein the space is configured for accommodating the tall structure part, in particular a nacelle assembly of a wind turbine.

20. Installation vessel according to the preceding clause, comprising a lifting frame configured to be connected to a lower portion of the tall structure part.

21. Installation vessel according to any of the preceding clauses 19-20, comprising a stabilizing device provided between the right and left boom part and a stabilized part of the tall structure part which is located above the lifting frame, wherein the stabilizing device is configured to hold the tall structure part upright.

22. Installation vessel according to the preceding clause, wherein the lifting frame has a right side and a left side, wherein a hoist line extend from the right boom part to the right side and wherein a hoist line extends from the left boom part to the left side of the frame.

23. Installation vessel according to any of the preceding clauses 19-22, wherein the stabilizing device comprises:
    one or more stabilizing lines which extend from the right and left boom part to the stabilized part of the tall structure part, and/or
    a clamp which is configured to be connected to the right and/or left boom part and which is positioned between the right and left boom part, and/or
    one or more cylinders are connected to the right and/or left boom part and are configured to extend to the stabilized part of the nacelle assembly above the lifting frame.

24. Installation vessel according to the preceding clause, wherein the clamp comprises a through opening which extends vertically, and wherein a part of the tall structure part extends through the through opening, and wherein in particular the clamp comprises:
    a first and second clamp part which are moveable relative to one another and enable the clamp to be opened in order to release the tall structure part after it has been positioned on the target location or
    an opening on one side allowing the tall structure part to be released from the clamp, an wherein the clamp is in particular configured to allow sliding of the tall structure part in a vertical direction relative to the clamp.

25. Installation vessel according to any of the preceding clauses 19-24, wherein the crane comprises a lower boom part and a junction at an upper end of the lower boom part wherein the right and left boom part extend from the junction.

26. Installation vessel according to any of the preceding clauses 19-25, wherein the right and left boom part extend over a vertical distance and over a horizontal distance from the junction.

27. Installation vessel according to clause 25 or 26, wherein the junction is located at 50 to 95 percent of a total height of the crane, preferably at 70 to 95 percent of the total height of the crane.

28. Installation vessel according to any of the preceding clauses 19-27, wherein the crane comprises at least a right hoisting system for hoisting the portion of the load suspended from the right boom part and a left hoisting system for hoisting the portion of the load suspended from the left boom part.

29. Installation vessel according to the preceding clause, wherein the right and left hoisting system are independently operable.

30. Installation vessel according to the preceding clause, wherein the right and left hoisting system comprise a load balancing device for balancing the load between the right and left hoisting system.

31. Installation vessel according to any of the preceding clauses 19-30, wherein the crane comprises a turret base, and wherein the turret base is mounted for rotation about a vertical axis on the deck or hull of the installation vessel.

32. Installation vessel according to any of the preceding clauses 19-31, wherein the right and left boom part define a V-shape.

33. Installation vessel according to any of the preceding clauses 19-32, wherein the right and left boom part comprise respective right and left free ends which are not interconnected by any beam.

34. Installation vessel according to the preceding clause, wherein an open space is provided between the right and left free ends of the respective right and left boom parts.

35. Installation vessel according to any of the preceding clauses 19-34, wherein a distance between right and left free ends of respective right and left boom parts is between 1.5 and 12 meters, preferably between 4 and 11 meters, more preferably between 5 and 10 meters.

36. Installation vessel according to any of the preceding clauses 19-35, wherein the lower boom part is pivotably connected to the turret base via a lower boom hinge and is pivotable about a horizontal lower boom pivot axis about the turret base.

37. Installation vessel according to any of the preceding clauses 19-36, wherein the junction is pivotably connected to the lower boom part via a junction hinge and pivotable relative to the lower boom part about a horizontal pivot axis.

38. Installation vessel according to any of the preceding clauses 19-37, wherein the right boom part and the left boom part are pivotably mounted to the junction via a right and left hinge, and wherein the angle enclosed between the right and left boom part is adjustable by pivoting the right and/or left boom part.

39. Installation vessel according to any of the preceding clauses 19-38, wherein the right boom part and the left boom part are removably mounted on the crane and replaceable with a single upper boom part, allowing the crane to be converted from a regular crane to the crane with right and left boom part or vice versa.
40. Installation vessel according to any of the preceding clauses 19-39, wherein:
    a) the crane is positioned on a bow of the vessel, in particular at a port side or starboard side thereof, and wherein a pickup area where the nacelle assembly is picked up is located aft or to the side of the crane, or
    b) wherein the crane is positioned on a stern of the installation vessel, in particular at a port side or starboard side thereof, and wherein a pickup area where the nacelle assembly is picked up is located forward or to the side of the crane, or
    c) the crane is positioned somewhere along the length to the vessel and wherein a pickup area is located on any side of the crane, or
    d) Any of the preceding options a)-c) wherein the pick-up area is located on an extension platform of the vessel which cantilevers outboard of the hull of the vessel.
41. Installation vessel according to any of the preceding clauses 19-40, wherein the left boom part and the right boom part diverge with respect to each other.
42. Installation vessel according to the preceding clause, wherein an angle of divergence ($\alpha$) between the left boom part and the right boom part during lifting is between 10 and 100 degrees, preferably between 45 and 100 degrees.
43. Installation vessel according to any of the preceding clauses 19-42, wherein the left boom part and the right boom part are identical and mirrored with respect to each other.
44. Combination of the installation vessel according to any of the preceding clauses 19-43 and a tall structure part, in particular a nacelle assembly.
45. Combination according to the preceding clause, wherein when seen in side view the nacelle of the nacelle assembly is supported at the horizontal level of the right and left boom part or above the right and left boom part.
46. Crane configured for lifting a tall structure part, in particular a nacelle assembly, of a tall structure, in particular a wind turbine, which is to be installed at a target location at sea, wherein an upper part of the crane comprises two boom parts, a right boom part and a left boom part, wherein a space is present between the right and left boom part, and wherein the space is configured for accommodating the tall structure part, in particular a nacelle assembly of a wind turbine.
47. Crane according to the preceding clause, comprising a lifting frame configured to be connected to a lower portion of the tall structure part.
48. Crane according to any of the preceding clauses 46-47, comprising a stabilizing device provided between the right and left boom part and a stabilized part of the tall structure part which is located above the lifting frame, wherein the stabilizing device is configured to hold the tall structure part upright.
49. Crane according to any of the preceding clauses 46-48, wherein the lifting frame has a right side and a left side, wherein a hoist line extend from the right boom part to the right side and wherein a hoist line extends from the left boom part to the left side of the frame.
50. Crane according to any of the preceding clauses 46-49, wherein the stabilizing device comprises:
    one or more stabilizing lines which extend from the right and left boom part to the stabilized part of the tall structure part, and/or
    a clamp which is configured to be connected to the right and/or left boom part and which is positioned between the right and left boom part, and/or
    one or more cylinders are connected to the right and/or left boom part and are configured to extend to the stabilized part of the nacelle assembly above the lifting frame.
51. Crane according to any of the preceding clauses 46-50, wherein the clamp comprises a through opening which extends vertically, and wherein a part of the tall structure part extends through the through opening, and wherein in particular the clamp comprises:
    a first and second clamp part which are moveable relative to one another and enable the clamp to be opened in order to release the tall structure part after it has been positioned on the target location or
    an opening on one side allowing the tall structure part to be released from the clamp,
    an wherein the clamp is in particular configured to allow sliding of the tall structure part in a vertical direction relative to the clamp.
52. Crane according to any of the preceding clauses 46-51, wherein the crane comprises a lower boom part and a junction at an upper end of the lower boom part wherein the right and left boom part extend from the junction.
53. Crane according to any of the preceding clauses 46-52, wherein the right and left boom part extend over a vertical distance and over a horizontal distance from the junction.
54. Crane according to clause 52 or 53, wherein the junction is located at 50 to 95 percent of a total height of the crane, preferably at 70 to 95 percent of the total height of the crane.
55. Crane according to any of the preceding clauses 46-54, wherein the left boom part and the right boom part diverge with respect to each other.
56. Crane according to the preceding clause, wherein an angle of divergence between the left boom part and the right boom part during lifting is between 10 and 100 degrees, preferably between 45 and 100 degrees.
57. Crane according to any of the preceding clauses 46-56, wherein the crane comprises at least a right hoisting system for hoisting the portion of the load suspended from the right boom part and a left hoisting system for hoisting the portion of the load suspended from the left boom part.
58. Crane according to any of the preceding clauses 46-57, wherein the right and left hoisting system are independently operable.
59. Crane according to any of the preceding clauses 46-58, wherein the right and left hoisting system comprise a load balancing device for balancing the load between the right and left hoisting system.
60. Crane according to any of the preceding clauses 46-59, wherein the crane comprises a turret base, and wherein the turret base is mounted for rotation about a vertical axis on the deck or hull of the installation vessel.

61. Crane according to any of the preceding clauses 46-60, wherein the right and left boom part define a V-shape.
62. Crane according to any of the preceding clauses 46-61, wherein the right and left boom part comprise respective right and left free ends which are not interconnected by any beam.
63. Crane according to the preceding clause, wherein an open space is provided between the right and left free ends of the respective right and left boom parts.
64. Crane according to any of the preceding clause 46-63, wherein a distance between right and left free ends of respective right and left boom parts is between 1.5 and 12 meters, preferably between 4 and 11 meters, more preferably between 5 and 10 meters.
65. Crane according to any of the preceding clauses 46-64, wherein the lower boom part is pivotably connected to the turret base via a lower boom hinge and is pivotable about a horizontal lower boom pivot axis about the turret base.
66. Crane according to any of the preceding clauses 46-65, wherein the junction is pivotably connected to the lower boom part via a junction hinge and pivotable relative to the lower boom part about a horizontal pivot axis.
67. Crane according to any of the preceding clauses 46-66, wherein the right boom part and the left boom part are pivotably mounted to the junction via a right and left hinge, and wherein the angle enclosed between the right and left boom part is adjustable by pivoting the right and/or left boom part.
68. Crane according to any of the preceding clauses 46-67, wherein the right boom part and the left boom part are removably mounted on the crane and replaceable with a single upper boom part, allowing the crane to be converted from a regular crane to the crane with right and left boom part or vice versa.
69. Crane according to any of the preceding clauses 46-68, wherein the left boom part and the right boom part are identical and mirrored with respect to each other.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the system and method according to the invention without departing from the scope as defined in the claims.

The invention claimed is:

1. A method for installing a wind turbine or other tall structure at a target location at sea, the method comprising:
providing an installation vessel comprising at least one crane, wherein the crane comprises a lower boom part, a right boom part, and a left boom part, wherein the right boom part and the left boom part are connected to an upper portion of the lower boom part and extend from said upper portion, wherein a space is present between the right and left boom part; and
lifting a tall structure part, with the crane, wherein in top view the tall structure part is supported at least partially between the right and left boom part by one or more hoist lines extending from the right and left boom part to the tall structure part.

2. The method according to claim 1, wherein a stabilizing device is provided between the right and/or left boom part and a stabilized part of the tall structure part which is located above a lifting frame, wherein the one or more hoist lines carry the weight of the tall structure part, and wherein the stabilizing device holds the tall structure part upright.

3. The method according to the claim 2, wherein the stabilizing device comprises:
one or more stabilizing lines which extend from the right and left boom part to the stabilized part above the lifting frame; and/or
a clamp which is connected to the right and/or left boom part and which is positioned between the right and left boom part, wherein the clamp holds the stabilized part of the tall structure part above the lifting frame; and/or
one or more cylinders which extend from the right and left boom part to the stabilized part of the tall structure part above the lifting frame, wherein the one or more cylinders are extended or shortened to stabilize the tall structure part.

4. The method according to claim 1, wherein the crane comprises at least a right hoisting system for hoisting a portion of a load suspended from the right boom part and a left hoisting system for hoisting the portion of the load suspended from the left boom part and wherein the right and left hoisting system cooperate in the lifting operation.

5. The method according to claim 1, wherein the crane initially comprises a single upper boom part, wherein the single upper boom part is removed and replaced by the right and left boom part prior to the lifting operation.

6. The method according to claim 1, wherein the crane comprises a junction at an upper end of the lower boom part, wherein the right and left boom part extend from the junction, wherein the right boom part and the left boom part are pivotably mounted to the junction via a right and left hinge, and wherein an angle enclosed between the right and left boom part is adjusted by pivoting the right and/or left boom part.

7. The method according to claim 1, wherein the tall structure part comprises a nacelle assembly.

8. An installation vessel configured for lifting a tall structure part of a tall structure comprising a wind turbine, which is to be installed at a target location at sea, the installation vessel comprising at least one crane, wherein an upper part of the crane comprises two boom parts, a right boom part and a left boom part, wherein the crane further comprises a lower boom part, wherein the right boom part and the left boom part are connected to an upper portion of the lower boom part and extend from said upper portion, wherein a space is present between the right and left boom part, and wherein the space is configured for accommodating the tall structure part.

9. The installation vessel according to claim 8, comprising a stabilizing device provided between the right and left boom part and a stabilized part of the tall structure part which is located above a lifting frame, wherein the stabilizing device is configured to hold the tall structure part upright.

10. The installation vessel according to claim 8, wherein the stabilizing device comprises:
one or more stabilizing lines which extend from the right and left boom part to a stabilized part of the tall structure part; and/or a clamp which is configured to be connected to the right and/or left boom part and which is positioned between the right and left boom part; and/or one or more cylinders are connected to the right and/or left boom part and are configured to extend to the stabilized part above a lifting frame.

11. The installation vessel according to claim 10, wherein the clamp comprises a through opening which extends vertically, and wherein a part of the tall structure part extends through the through opening, and wherein in particular the clamp comprises:

a first and second clamp part which are moveable relative to one another and enable the clamp to be opened in order to release the tall structure part after it has been positioned on the target location; or an opening on one side allowing the tall structure part to be released from the clamp, and wherein the clamp is in particular configured to allow sliding of the tall structure part in a vertical direction relative to the clamp.

12. The installation vessel according to claim 8, wherein the left and right boom part are connected to a base of the crane via a hinge, either directly or indirectly via another crane part, the lower boom part, which is connected to the base of the crane by said hinge, allowing the left and right boom part to pivot upward and downward.

13. The installation vessel according to claim 12, wherein the left and right boom part are pivotable up and down together with the lower boom part.

14. The installation vessel according claim 13, wherein cables extend from a part of the crane to the left and right boom part.

15. The installation vessel according to claim 8, wherein the crane comprises a junction at an upper end of the lower boom part, wherein the right and left boom part extend over a vertical distance and over a horizontal distance from the junction.

16. The installation vessel according to claim 15, wherein the junction is located at 50 to 95 percent of a total height of the crane.

17. The installation vessel according to claim 8, wherein the crane comprises a turret base, and wherein the turret base is mounted for rotation about a vertical axis on a deck or hull of the installation vessel.

18. The installation vessel according to claim 8, wherein the left boom part and the right boom part diverge with respect to each other to define a V-shape, and wherein an angle of divergence ($\alpha$) between the left boom part and the right boom part during lifting is between 10 and 100 degrees.

19. The installation vessel according to claim 8, wherein a junction is pivotably connected to the lower boom part via a junction hinge and pivotable relative to the lower boom part about a horizontal pivot axis, and/or wherein the right boom part and the left boom part are pivotably mounted to the junction via a right and left hinge, and wherein an angle enclosed between the right and left boom part is adjustable by pivoting the right and/or left boom part.

20. The installation vessel according to claim 8, wherein the right boom part and the left boom part are removably mounted on the crane and replaceable with a single upper boom part, allowing the crane to be converted from a regular crane to the crane with right and left boom part or vice versa.

21. A combination of the installation vessel according to claim 8 and a tall structure part, wherein when seen in side view the tall structure part is supported at a horizontal level of the right and left boom part or above the right and left boom part.

22. The combination according to claim 21, wherein the tall structure part comprises a nacelle assembly.

23. The installation vessel according to claim 8, wherein the tall structure part comprises a nacelle assembly.

* * * * *